United States Patent [19]
Hall et al.

[11] Patent Number: 5,786,856
[45] Date of Patent: Jul. 28, 1998

[54] METHOD FOR ADAPTIVE QUANTIZATION BY MULTIPLICATION OF LUMINANCE PIXEL BLOCKS BY A MODIFIED, FREQUENCY ORDERED HADAMARD MATRIX

[75] Inventors: Barbara Ann Hall, Endwell; John Mark Kaczmarczyk, Endicott; Agnes Yee Ngai, Endwell; Robert Leslie Woodward, Newark Valley, all of N.Y.

[73] Assignee: International Business Machines, Armonk, N.Y.

[21] Appl. No.: 618,659

[22] Filed: Mar. 19, 1996

[51] Int. Cl.$^6$ ..................................................... H04N 7/18
[52] U.S. Cl. .................. 348/403; 348/405; 348/402; 348/394; 348/395; 348/420
[58] Field of Search ........................... 348/419, 420, 348/422, 405, 406, 410, 402, 403, 384, 394, 395

[56] References Cited

U.S. PATENT DOCUMENTS

| | | | |
|---|---|---|---|
| 4,633,296 | 12/1986 | Cham et al. | 358/133 |
| 4,853,969 | 8/1989 | Weideman | 382/54 |
| 5,038,209 | 8/1991 | Hang | 358/136 |
| 5,089,888 | 2/1992 | Zdepski et al. | 358/133 |
| 5,150,433 | 9/1992 | Daly | 382/56 |
| 5,172,228 | 12/1992 | Israelsen | 358/133 |
| 5,237,410 | 8/1993 | Inoue | 358/136 |
| 5,241,395 | 8/1993 | Chen | 358/261.3 |
| 5,241,401 | 8/1993 | Fujiwara et al. | 358/404 |
| 5,245,427 | 9/1993 | Kunihiro | 358/133 |
| 5,260,782 | 11/1993 | Hui | 358/133 |
| 5,301,032 | 4/1994 | Hong et al. | 358/133 |
| 5,301,242 | 4/1994 | Gonzales et al. | 382/56 |
| 5,335,016 | 8/1994 | Nakagawa | 348/405 |
| 5,369,439 | 11/1994 | Matsuda et al. | 348/405 |
| 5,374,958 | 12/1994 | Yanagihara | 348/405 |
| 5,396,567 | 3/1995 | Jass | 382/56 |

FOREIGN PATENT DOCUMENTS 4180356 6/1992 Japan .

*Primary Examiner*—Tommy P. Chin
*Assistant Examiner*—Anand S. Rao
*Attorney, Agent, or Firm*—Richard M. Goldman

[57] ABSTRACT

A method for spatial compression of a digital video picture to obtain the quantizer step size so as to avoid over "lossy" reconstruction and loss of detail. The first step is dividing the picture into a plurality of macroblocks, for example, 16×16 macroblocks, each macroblock having luminance or chrominance pixel blocks, for example four 8×8 pixel blocks. This is followed by multiplying each luminance pixel block by a modified frequency ordered Hadamard matrix to yield a first dimension of each luminance pixel block. The first dimension of each pixel block is then multiplied by the inverse of the modified frequency ordered Hadamard matrix to yield a second dimension of each luminance pixel block. The second dimension of the pixel luminance block is then weighted against a weight matrix, and the individual weighted terms are summed for each pixel block. The minimum of the weighted terms is selected. This minimum is used to detect the edge or texture of the macroblock, e.g., for setting the quantizer step size.

8 Claims, 5 Drawing Sheets

WHERE

H = 8X8 FREQUENCY MODIFIED HADAMARD MATRIX
M = 8X8 PIXEL BLOCK, EITHER LUMINENCE OR CHROMINANCE
$H^{-1}$ = INVERSE OF 8X8 FREQUENCY ORDERED HADAMARD MATRIX (1) STEP 1

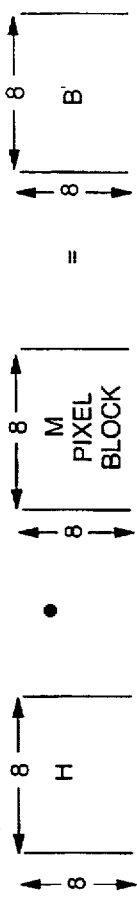

$$H \cdot \begin{bmatrix} M \\ \text{PIXEL} \\ \text{BLOCK} \end{bmatrix} = \begin{bmatrix} B' \end{bmatrix}$$

WHERE $$H = \begin{bmatrix}
1 & 1 & 1 & 1 & 1 & 1 & 1 & 1 \\
1 & 1 & 1 & 1 & -1 & -1 & -1 & -1 \\
1 & 1 & -1 & -1 & -1 & -1 & 1 & 1 \\
1 & 1 & -1 & -1 & 1 & 1 & -1 & -1 \\
1 & -1 & -1 & 1 & 1 & -1 & -1 & 1 \\
1 & -1 & -1 & 1 & -1 & 1 & 1 & -1 \\
1 & -1 & 1 & -1 & -1 & 1 & -1 & 1 \\
1 & -1 & 1 & -1 & 1 & -1 & 1 & -1
\end{bmatrix}$$

IS THE FREQUENCY ORDER HADAMARD MATRIK (2) STEP 2

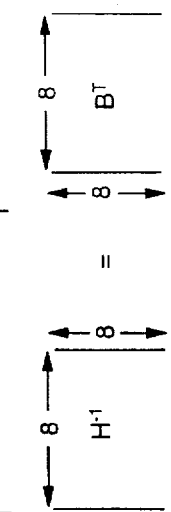

FIG. 5A (3) STEP 3

Σ ROWS  Σ COLUMNS

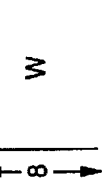

FIG. 5B

METHOD FOR ADAPTIVE QUANTIZATION BY MULTIPLICATION OF LUMINANCE PIXEL BLOCKS BY A MODIFIED, FREQUENCY ORDERED HADAMARD MATRIX

FIELD OF THE INVENTION

The invention relates to compression of digital visual images, and more particularly to spatial compression, that is reduction or even elimination of redundancy within a picture. According to the invention, adaptive spatial compression is used to detect such image features as edges and textures and avoid loss of these features.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and videoconferencing to subscribers, an enormous amount of network bandwidth is required. In fact, network bandwidth is often the main inhibitor to the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture, i.e., spatial compression, and between pictures, i.e., temporal compression. Video compression within a picture is a lossy compression accomplished by conversion of the digital image from the time domain to the frequency domain by a discrete cosine transform, quantization, variable length coding, and Huffman coding. Data lost due to quantization results in the reconstruction of less than the original image. Hence, the process is lossy. Video compression between pictures is accomplished by a process referred to as motion estimation, in which a motion vector is used to describe the translation of a set of picture elements (pels) from one picture to another.

A typical video picture contains both spatial and temporal redundancies. Spatial redundancies are redundant information in the horizontal and vertical dimensions of a picture, that is, data that is similar or repeats itself in a picture area. Temporal redundancies are redundant information over time, that is, data that is similar or repeats itself from picture to picture.

Video compression is a technique that removes some picture data without introducing objectionable distortions to the human perception. The human visual system is very sensitive to distortions that appear in a smooth area of a picture. Thus, great care must be taken in encoding a smooth or low complexity, low activity area of a picture. This is so that less data is lost in these areas.

Quantization is one of several techniques used in the removal of redundancies where loss can arise. Quantization arises in every analog to digital or time domain to frequency domain conversion. Quantization is part of the MPEG standard. However, the MPEG standard does not specify the quantization technique or how to determine the quantization levels.

Quantization is an operation that reduces the number of symbols that need to be encoded. However, this is at the cost of introducing errors in the reconstructed or dequantized image. That is, quantization is a process of assigning discrete values to a continuously valued function. As noted above, there is some loss of information. Hence, quantization is referred to as "lossy."

There are two kinds of quantization: scalar and vector. The quantization of each coefficient in a macroblock is called "scalar." The joint quantization of all of the coefficient values in a macroblock is called "vector." Vector quantization is a uniform function where the quantization level is of equal length for all of the coefficients in the macroblock, and is referred to as the "step size."

A large step size provides high compression, but creates more distortion. A small step size creates less distortion, but at the cost of less compression. If there is a fine line in an image, the large step size associated with high compression may eliminate that fine line in the reconstructed image. Thus, it is necessary to adaptively select the step size to avoid excessive loss of detail, especially in textured pictures and at edges of images.

$M_{quant}$ is used to determine the perceptual limit on step size. Either or both of two functions may be used by the encoder to determine the perceptual $M_{quant}$ which is then used in determining the macroblock quantization step size. These two functions are edge detection and texture activity of the image. Edge detection provides information and location of coefficients where the minimum step size is desirable. Texture activity provides the information and location of coefficients that are more correlated and where a larger step size will produce less visual distortion.

OBJECTS OF THE INVENTION

It is one objective of the invention to provide a means of adaptively selecting the quantization step size to avoid excessive loss in the reconstructed picture.

It is a further objective of the invention to provide on-line, real time measurement of edge detection and texture activity.

SUMMARY OF THE INVENTION

These and other objectives are attained by the method and system of the invention.

The method and apparatus of the invention detect both edges between arrangements of pixels within a macroblock and textures within a segment of picture in a macroblock. This is part of the spatial activity measurement, which is used in the calculation of the perceptual $M_{quant}$. The spatial activity measurement is accomplished through the use of the Hadamard transform to calculate pixel spatial activity within a macroblock. Specifically, a modified, frequency ordered Hadamard image matrix is applied against the luminance pixel blocks in a macroblock. That is, the block of pixels is multiplied by the modified Hadamard matrix to produce an output matrix. This operation is called the "first dimension" of the calculation. The output matrix from the first dimension of the calculation is then multiplied by the inverse of the modified Hadamard matrix to produce a "second dimension" output matrix. This second dimension output matrix is then weighted against a user supplied or default "weighting" matrix. That is, the second dimension output matrix is multiplied by the corresponding terms in the weight matrix.

3

The weighted terms of each matrix are then individually summed to produce a final single scalar result for each matrix.

This entire operation is performed in parallel on all of the luminance blocks, so that at the end of the calculation, separate final results remain, one for each luminance block or matrix. At this point the minimum value of the separate results is selected. This value is used directly in determining perceptual $M_{quant}$.

Edge detection in the macroblock is accomplished by the appropriate selection of a high or low frequency weight matrix in the final step of the Hadamard transformation. Values in this user weighted matrix are restricted to 0, 1, −1, and 2.

Perceptual $M_{quant}$ may be calculated based on texture activity rather than edge detection in the macroblock. If this is the case, a "default" weighting matrix may be used in the final step of the Hadamard transformation. This matrix has a zero weighting for the DC term in the pixel block, and a weight of all 1's for every other term.

Edge detection may be preferred in applications where the video sequence contains sharp edges between pixel groupings, for example, a video sequence that contains rolling or stationary text. On the other hand, texture activity may be preferred for a video application that contains mostly rolling scenery that blends together.

THE FIGURES

The invention may be more clearly understood by reference to the Figures appended hereto.

FIG. 1 shows a flow diagram of a generalized MPEG2 compliant encoder 11, including a discrete cosine transformer 21, a Quantizer 23, a variable length coder 25, an inverse Quantizer 29, an inverse discrete cosine transformer 31, motion compensation 41, frame memory 42, and motion estimation 43. The data paths include the ith picture input 111, the picture output 121, the feedback picture for motion estimation and compensation 131, and the motion compensated picture 101. This FIGURE has the assumptions that the ith pictures exists in Frame Memory or Frame Store 42, and that the i+1th picture is being encoded with motion estimation.

Figure 1:
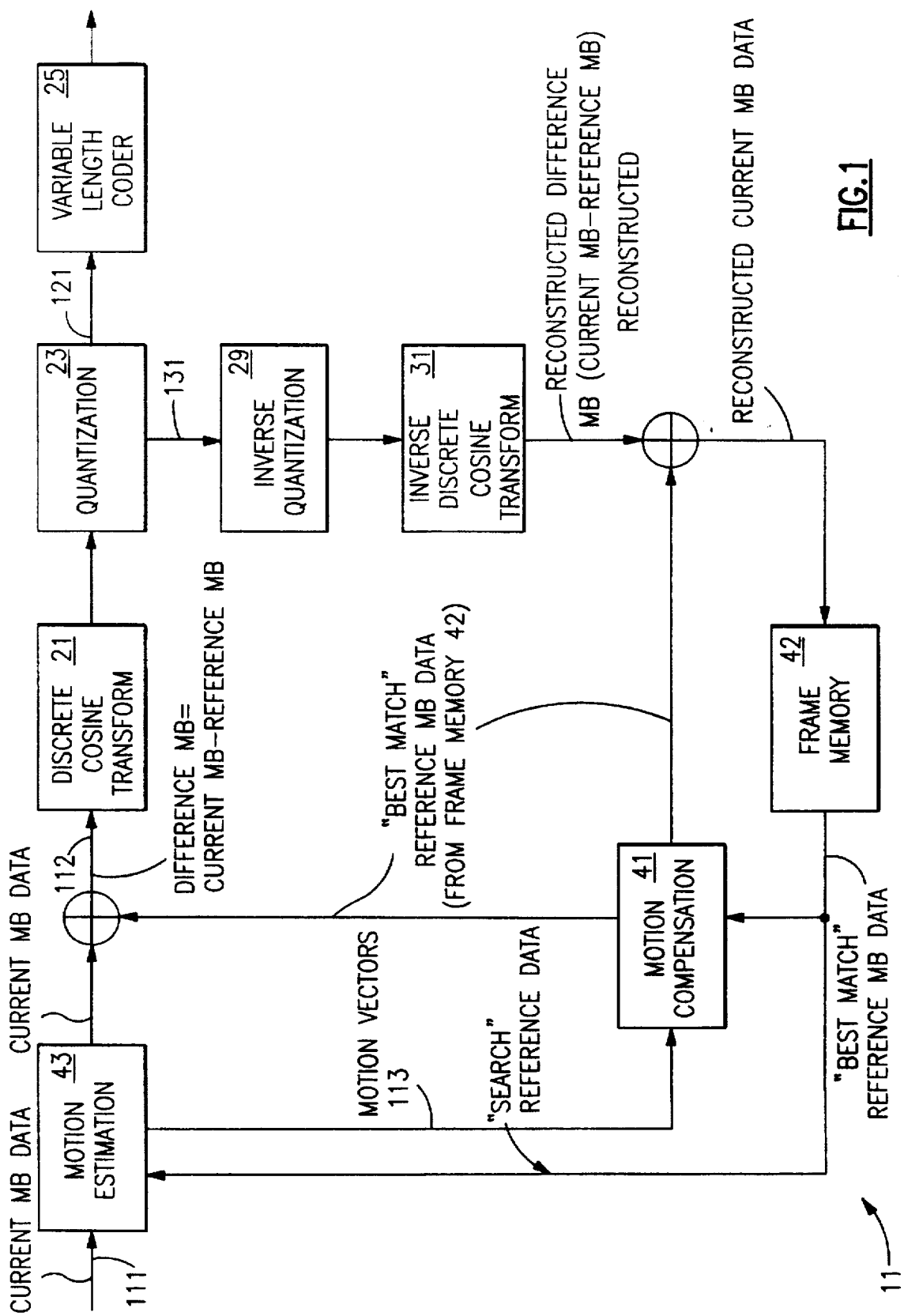

FIG. 5, including FIGS. 5A and 5B, shows the Hadamard matrix multiplication operations of the invention where the process (HM)H−1 is performed. H is a modified frequency ordered 8×8 Hadamard matrix, M is an 8×8 luminance, H−1 is an inverse Hadamard matrix where H=H−1, and W is a user supplied or default weight matrix. Step 1 is the matrix multiplication HM=B. Step 2 is the matrix multiplication BH−1=BT. Step 3 is the multiplication of the weight matrix by the product of the above multiplication, that is W BT=R. The values in W correspond to 0, 1, −1 and 2. Ri equals the final calculated value for the Yi block.

4

DETAILED DESCRIPTION OF THE INVENTION

The invention relates to MPEG and HDTV compliant encoders and encoding processes. The encoding functions performed by the encoder include data input, spatial compression and motion estimation. Spatial compression includes discrete cosine transformation, quantization, and Huffman encoding. Motion estimation, that is temporal compression, includes macroblock mode generation, data reconstruction, entropy coding, and data output. Motion estimation and compensation are the temporal compression functions. They are repetitive functions with high computational requirements, and they include intensive reconstructive processing, such as inverse discrete cosine transformation, inverse quantization, and motion compensation.

More particularly the invention relates to spatial compression in the vicinity of discontinuities, edges, and texture in the picture being compressed.

Spatial compression is the elimination of spatial redundancy, for example the elimination of spatial redundancy in an I still picture. Because of the block based nature of the motion compensation process, as described below, it was desirable for the MPEG2 Standard to also use a block based method of reducing spatial redundancy. The method of choice is the Discrete Cosine Transform, and Discrete Cosine Transforming of the picture. Discrete Cosine Transformation is combined with weighted scalar quantization and run length encoding to achieve even higher levels of compression.

The Discrete Cosine Transform is a well known orthogonal transformation. Orthogonal transformations have a frequency domain interpertation and are, therefore, filter bank oriented. The discrete cosine transform is also localized. That is, the encoding process samples an 8×8 spatial window which is sufficient to compute 64 transform coefficients or sub-bands.

Another advantage of the Discrete Cosine Transform is that fast encoding and decoding algoritms are available. Additionally, the sub-band decomposition of the Discrete Cosine Transformation is sufficiently well behaved to allow effective use of psychovisual criteria, for example to calculate $M_{quant}$.

After discrete cosine transformation, many of the higher frequency components, and substantially all of the highest frequency components approach zero. These coefficients are organized in a zig-zag pattern, as is well known in the art. The higher frequency terms are dropped. The remaining terms are coded in a Variable Length Code.

Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the ith picture will be in the i−1th or i+1th picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flow chart of MPEG compliant encoding is shown in FIG. 1. In the flow chart the images of the ith picture and the i+1th picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the ith picture to the i+1th picture.

As shown in FIG. 1, in the encoding process, the images of the ith picture and the i+1th picture are processed in the encoder 11 to generate motion vectors which are the form in which, for example, the i+1th and subsequent pictures are encoded and transmitted. An input image 111' of a subsequent picture goes to the Motion Estimation unit 43 of the encoder. Motion vectors 101 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 43.

Figure 2:
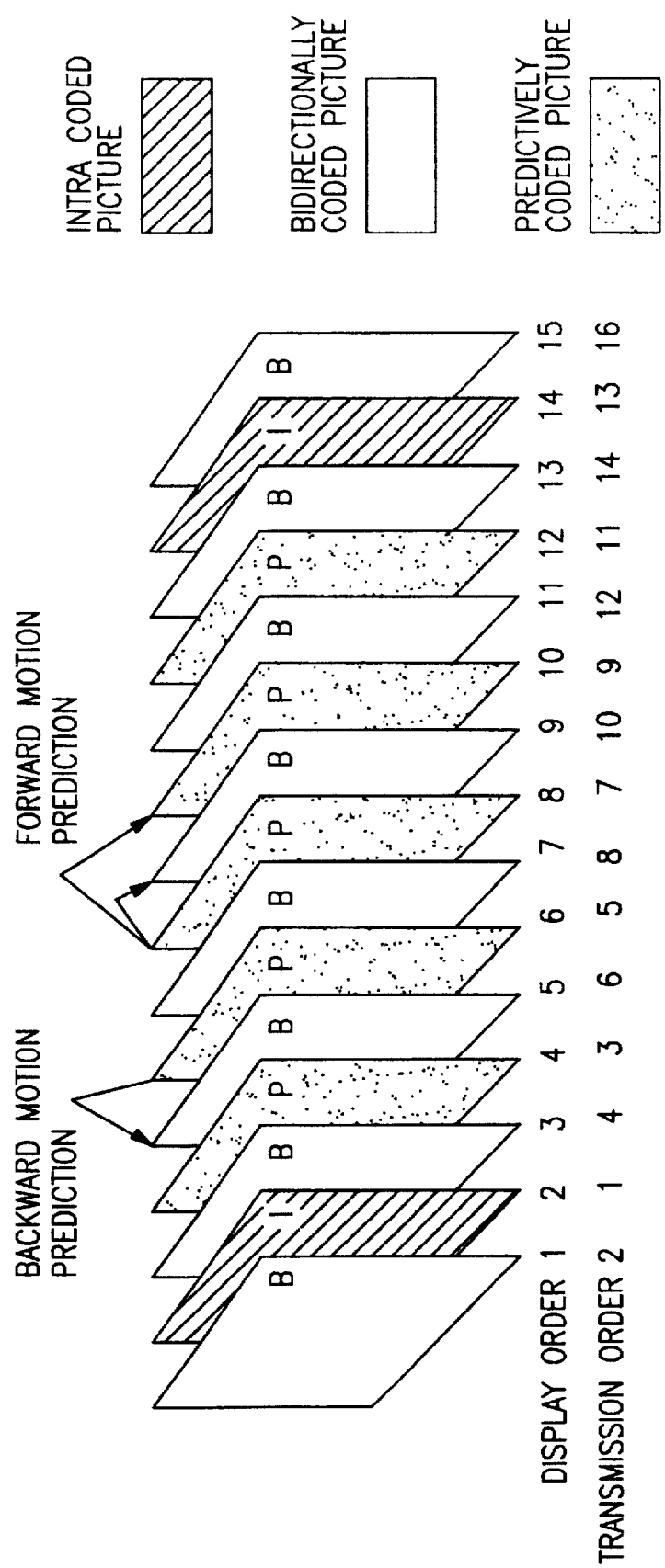
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
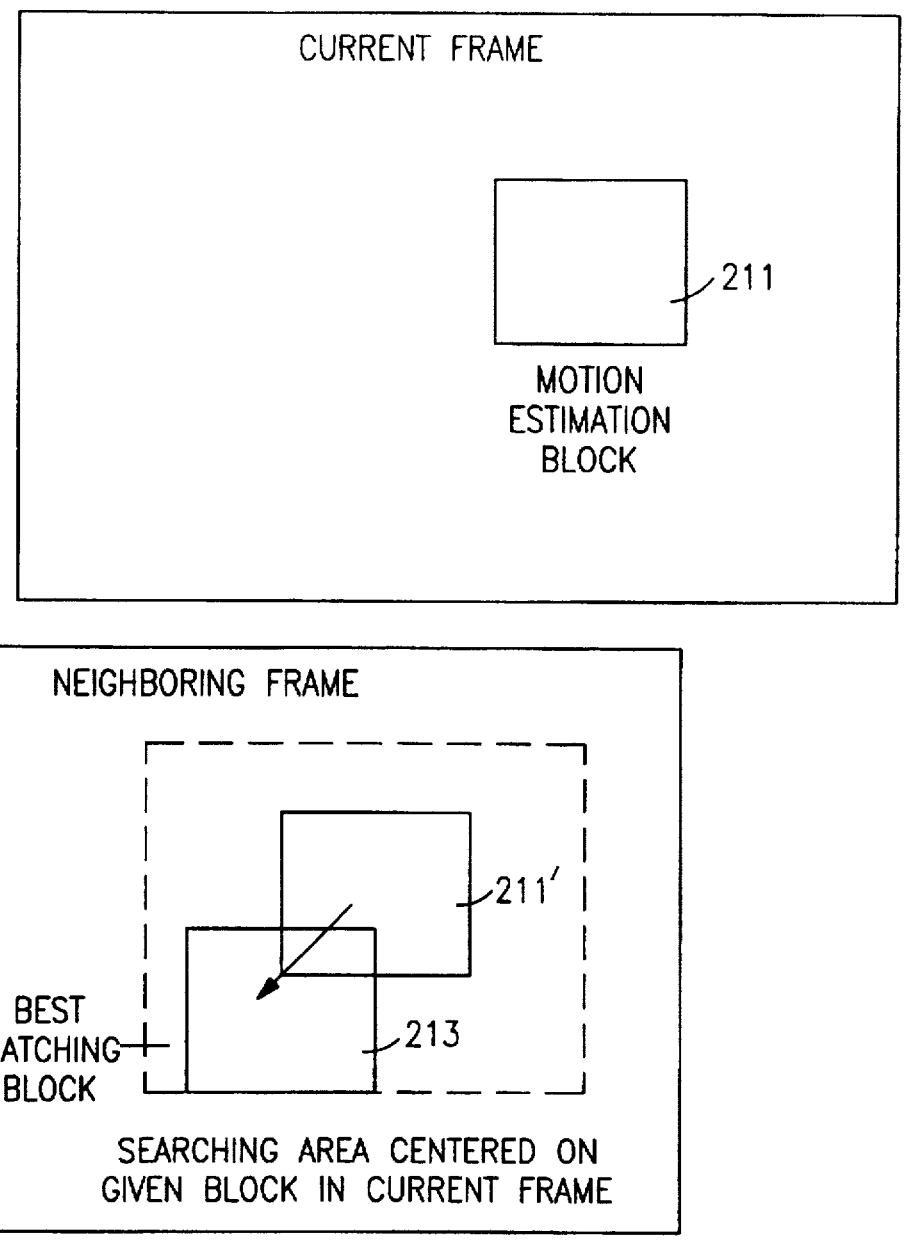
FIG. 3 illustrates the search from the motion estimation block in the current frame or picture to the best matching block in subsequent or previous frame or picture. Elements 211 and 211' represent the same location in both search windows.
Figure 4:
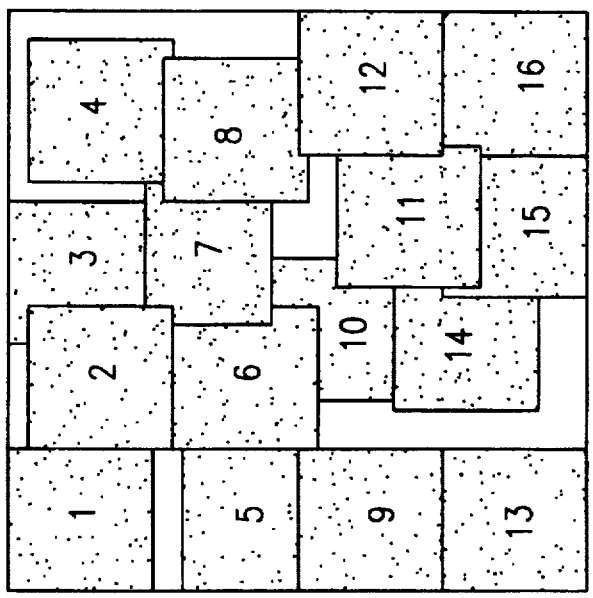
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an ith picture throughout a region of the previous picture to find the best match macroblock 213. Translating the macroblocks in this way yields a pattern of macroblocks for the i+1th picture, as shown in FIG. 4. In this way the ith picture is changed a small amount, e.g., by motion vectors and difference data, to generate the i+1th picture. What is encoded are the motion vectors and difference data, and not the i+1th picture itself. Motion vectors translate position of an image from picture to picture, while difference data carries changes in chrominance, luminance, and saturation, that is, changes in shading and illumination.

Returning to FIG. 3, we look for a good match by starting from the same location in the ith picture as in the i+1th picture. A search window is created in the ith picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The method and apparatus of the invention detect edges between arrangements of pixels within a macroblock and texture within an image. This is part of the spatial activity measurement, which is used in the calculation of the perceptual $M^{quant}$. Calculation of $M_{quant}$ is accomplished through the use of the Hadamard transform to calculate pixel spatial activity, that is edges and textures within an image, within a macroblock. A 16×16 macroblock is divided into four 8×8 luminance blocks. Then, a modified frequency ordered 8×8 Hadamard image matrix is applied against the four 8×8 luminance pixel blocks in the macroblock. That is, as shown in FIG. 5, the 8×8 block of pixels is multiplied by the modified, frequency ordered 8×8 Hadamard matrix to produce an 8×8 output matrix. This operation is called the "first dimension" of the calculation. The output matrix from the first dimension of the calculation is then multiplied by the inverse of the Hadamard matrix to produce a "second dimension" 8×8 output matrix. This second dimension output matrix is then weighted against a user supplied or default 8×8 "weighting" matrix, W. That is, the 8×8 second dimension output matrix is multiplied by the corresponding terms in the weight matrix, and the weighted terms in each individual 8×8 matrix are then summed to produce a final result.

This entire operation is performed in parallel on all four luminance blocks, so that at the end of the calculation, four final results remain. At this point the minimum value of the four results is selected. This value is used directly in determining perceptual $M_{quant}$.

Edge detection in the macroblock is accomplished by the appropriate selection of a high or low frequency weight matrix in the final step of the Hadamard transformation. Values in the 8×8 weight matrix, W in FIG. 5, are restricted to 0, 1, −1, and 2.

Perceptual $M_{quant}$ may be calculated based on texture activity rather than edge detection in the macroblock. If this is the case, a "default" weighting matrix, that is, a user programmable weight matrix, may be used in the final step of the Hadamard transformation. This matrix has a zero weighting for the DC term in the pixel block, and a weight of all 1's for every other term.

Edge detection may be preferred in applications where the video sequence contains sharp edges between pixel groupings, for example, a video sequence that contains rolling or stationary text. On the other hand, texture activity may be preferred for a video application that contains mostly rolling scenery that blends together.

While the invention has been described with respect to certain preferred embodiments and exemplifications, it is not intended to limit the scope of the invention thereby, but solely by the claims appended hereto.

We claim:

1. A method for spatial compression of a digital video picture comprising the steps of:
   a. dividing the picture into a plurality of macroblocks, each macroblock having pixel blocks;
   b. multiplying each pixel block by a modified frequency ordered Hadamard matrix to yield a first dimension of each pixel block;
   c. multiplying the first dimension of each luminance pixel block by the inverse of the modified frequency ordered Hadamard matrix to yield a second dimension of each pixel block;
   d. weighting the second dimension of each pixel block against a programmable weight matrix, and summing the weighted terms of each pixel block to obtain one sum for each pixel block; and
   e. selecting the minimum of the sums of the pixel blocks to thereby detect edge or texture of the macroblock.

2. The method of claim 1 wherein the pixel blocks are luminance pixel blocks.

3. The method of claim 1 wherein the pixel blocks are chrominance pixel blocks.

4. The method of claim 1 comprising dividing the picture into a plurality of 16×16 macroblocks.

5. The method of claim 4 wherein each macroblock has four 8×8 luminance pixel blocks.

6. The method of claim 5 comprising multiplying each pixel block by a modified frequency ordered 8×8 Hadamard matrix to yield a first dimension.

7. A method for spatial compression of a digital video picture comprising the steps of:
   a. dividing the picture into a plurality of 16×16 macroblocks, each macroblock having four 8×8 luminance pixel blocks;
   b. multiplying each luminance pixel block by a modified frequency ordered Hadamard matrix to yield a first dimension of each luminance pixel block;
   c. multiplying the first dimension of each luminance pixel block by the inverse of the modified frequency ordered Hadamard matrix to yield a second dimension of each luminance pixel block;
   d. weighting the second dimension of the pixel luminance block against a weight matrix, and summing the weighted terms for each luminance pixel block; and
   e. selecting the minimum of the sums of the pixel blocks to thereby detect edge or texture of the macroblock.

8. A method for spatial compression of a digital video picture comprising the steps of:
   a. dividing the picture into a plurality of 16×16 macroblocks, each macroblock having four 8×8 luminance pixel blocks;
   b. multiplying in parallel each of the four luminance pixel blocks of a macroblock by a modified frequency ordered Hadamard matrix to yield a first dimension for each of the four luminance pixel blocks;
   c. multiplying in parallel each of the first dimensions of each of the four luminance pixel blocks by the inverse of the modified frequency ordered Hadamard matrix to yield a second dimension for each of the four luminance pixel blocks;
   d. weighting the second dimension of the four pixel luminance blocks against a programmable weight matrix, and summing the weighted terms for each of the four luminance pixel blocks; and
   e. selecting the minimum of the sums of the four pixel blocks to thereby detect edge or texture of the macroblock.

* * * * *